United States Patent
Ho et al.

(10) Patent No.: US 9,178,735 B1
(45) Date of Patent: Nov. 3, 2015

(54) PHASE-MODULATED ON-OFF KEYING FOR MILLIMETER WAVE SPECTRUM CONTROL

(71) Applicant: Silicon Image, Inc., Sunnyvale, CA (US)

(72) Inventors: Ricky Keangpo Ho, San Jose, CA (US); Shi Cheng, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/339,393

(22) Filed: Jul. 23, 2014

(51) Int. Cl.
*H04L 27/18* (2006.01)
*H04L 27/20* (2006.01)

(52) U.S. Cl.
CPC ..................... *H04L 27/20* (2013.01)

(58) Field of Classification Search
CPC ......... H04L 27/02; H04L 27/04; H04L 27/18; H04L 27/2096; H01L 23/66; H04B 10/506; H04B 10/613; H04W 52/262
USPC .................. 375/219, 295, 308, 279, 220, 330
See application file for complete search history.

(56) References Cited

U.S. PATENT DOCUMENTS

2011/0075713 A1* 3/2011 Lovberg et al. ............... 375/219

OTHER PUBLICATIONS

Lee, J. et al., "A Low-Power Low-Cost Fully-Integrated 60-GHz Transceiver System with OOK Modulation and On-Board Antenna Assembly," IEEE Journal of Solid-State Circuits, Feb. 2010, pp. 264-275, vol. 45, No. 2.
Lender, A. "Correlative Level Coding for Binary-Data Transmission," IEEE Spectrum, Feb. 1966, pp. 104-115, vol. 3, No. 2.

* cited by examiner

*Primary Examiner* — Rahel Guarino
(74) *Attorney, Agent, or Firm* — Fenwick & West LLP

(57) ABSTRACT

A transmitting apparatus for generating a phase-modulated carrier signal with on-off keying (OOK) includes a coding circuitry for receiving binary digital data and generating an on-off keying (OOK) signal representing the binary digital data. The coding circuitry generates a phase modulation control signal for controlling a phase modulation of a millimeter wave carrier signal based on the on and off pattern of the OOK signal. The apparatus also includes a phase modulation circuitry for applying the phase modulation to the millimeter wave carrier signal based on the phase modulation control signal to generate a phase-modulated carrier signal, and a power amplifier for generating, based on the OOK signal and the phase-modulated carrier signal, an amplified phase-modulated carrier signal with OOK. The apparatus includes an interface to transmit the amplified phase-modulated carrier signal with OOK to a receiving apparatus via a millimeter wave communication link.

23 Claims, 5 Drawing Sheets

PHASE-MODULATED ON-OFF KEYING FOR MILLIMETER WAVE SPECTRUM CONTROL

BACKGROUND

1. Field of the Disclosure

Embodiments of the present disclosure generally relate to the field of electronic devices and, more particularly, to applying phase modulation onto millimeter waves with on-off keying (OOK) for spectrum control.

2. Description of the Related Art

Extremely high frequency (EHF) is part of the radio frequency in the electromagnetic spectrum. For example, EHF runs the range of frequencies from 30-300 gigahertz (GHz). Radio waves in this band have wavelengths from one to ten millimeter, giving it the name of millimeter band or millimeter wave. Because of the shorter wavelengths, this band permits the use of smaller antennas than would be required for similar circumstances in the lower frequency bands, to achieve the same high directivity and high gain. High directivity enables a more efficient use of the spectrum for point-to-point communications, interstatellite links, point-to-multipoint communications, etc.

In particular, signals in the 57-64 GHz region are subject to a resonance of the oxygen molecule and are severely attenuated in atmosphere. Therefore, these millimeter bands have an even larger frequency reuse potential and can be widely used in many applications. For example, the 60 GHz band can be used for unlicensed short range (1.7 kilometer) data links. The 60 GHz band can also be used for Wi-Fi standard IEEE 802.11 ad data links with data transfer rates of up to 7 gigabit (Gbit) per second. WirelessHD is another technology that operates near the 60 GHz range. Specifically, the WirelessHD specification is based on a 7 GHz channel in the 60 GHz radio band. Highly directional signal characteristics permit systems in these bands to be engineered in close proximity to one another without causing interference.

However, the regulated bandwidth is limited for this millimeter band in the U.S. and other jurisdictions. For example, the 60 GHz band has an only 7 GHz bandwidth regulated by U.S. Federal Communications Commission (FCC). In addition, the current data transfer rate for the 60 GHz band is less than 4 Gbit per second, which is not high enough for many applications. With a flat frequency spectrum, the bandwidth is not used efficiently. Therefore, there is a need for reducing the effective bandwidth of the frequency spectrum or concentrating the frequency spectrum to the center of the band, and thus increasing the efficiency of the band usage and achieving higher data transfer rates. Although the data rate may be increased by advanced modulation method that increases signal processing complexity to recover the signal, low-complexity transmitter and receiver are always desirable for a product to lower cost, power consumption, maintenance expense, management complexity, integration difficulty, and physical size.

SUMMARY

Embodiments of the present disclosure are generally directed to phase-modulated carrier signals with on-off keying for millimeter wave communication. In some embodiments, a method, apparatus, or system provides phase-modulation of a carrier signal with on-off keying for millimeter wave communication such as 60 GHz millimeter wave communications.

In one embodiment, a computer-implemented method comprises generating, at a transmitting apparatus, an on-off keying (OOK) signal representing binary digital data; generating, at the transmitting apparatus, a phase modulation control signal for controlling a phase modulation of a millimeter wave carrier signal based on the on and off pattern of the OOK signal; applying, at the transmitting apparatus, the phase modulation to the millimeter wave carrier signal based on the phase modulation control signal to generate a phase-modulated carrier signal; generating, at the transmitting apparatus, an amplified phase-modulated carrier signal with OOK based on the OOK signal and the phase-modulated carrier signal; and transmitting, at the transmitting apparatus, the amplified phase-modulated carrier signal with OOK to a receiving apparatus via a millimeter wave communication link.

In one embodiment, the phase modulation control signal controls phase modulation during on-periods of the OOK signal. In one embodiment, the phase modulation comprises a duobinary phase modulation and generating a phase modulation control signal for controlling the phase modulation of a millimeter wave carrier signal based on the on and off pattern of the OOK signal comprises: counting a number of consecutive off-periods of the OOK signal between a previous on-period of the OOK signal and a current on-period of the OOK signal; responsive to determining that the number of the consecutive off-periods is even, generating the phase modulation control signal to control the phase modulation circuit to apply a same phase shift to the millimeter wave carrier signal for the current on-period as applied for the previous on-period; and responsive to determining that the number of the consecutive off-periods is odd, generating the phase modulation control signal to control the phase modulation circuit to apply a different phase shift to the millimeter wave carrier signal for the current on-period relative to a phase shift applied for the previous on-period. In one embodiment, applying the different phase shift comprises applying no phase shift to the millimeter wave carrier signal for the current on-period responsive to the previous on-period having a phase of pi radians; and applying a phase shift of pi radians to the millimeter wave carrier signal for the current on-period responsive to the previous on-period having a phase of zero radians.

In one embodiment, the phase modulation comprise an alternating phase modulation and generating a phase modulation control signal for controlling the phase modulation of a millimeter wave carrier signal based on the on and off pattern of the OOK signal comprises: determining a first phase shift applied to the millimeter wave carrier signal for a previous on-period prior to a current on-period; applying a same phase shift to the millimeter wave carrier signal for the current on-period if there are no off-periods between the previous on-period and the current on-period; and applying a second phase shift to the millimeter wave carrier signal for the current on-period if there are one or more off-periods between the previous on-period and the current on-period, the second phase shift having a different value from that of the first phase shift. For example, the first phase shift has a value of zero radians (0 degrees) and the second phase shift has a value of pi radians (180 degrees). In one embodiment, the method further comprises storing the first phase shift of the previous on-period.

In one embodiment, a transmitting apparatus comprises: a coding circuit for receiving binary digital data and generating an on-off keying (OOK) signal representing the binary digital data, the coding circuit also generating a phase modulation control signal for controlling a phase modulation of a millimeter wave carrier signal based on the on and off pattern of the OOK signal; a phase modulation circuit communicatively connected to the coding circuit for receiving the phase modulation control signal and the millimeter wave carrier signal, the phase modulation circuit applying the phase modulation to the millimeter wave carrier signal based on the phase modulation control signal to generate a phase-modulated carrier signal; a power amplifier communicatively connected to the coding circuit and the phase modulation circuit for receiving the OOK signal and the phase-modulated carrier signal, the power amplifier generating, based on the OOK signal and the phase-modulated carrier signal, an amplified phase-modulated carrier signal with OOK; and an interface to transmit the amplified phase-modulated carrier signal with OOK to a receiving apparatus via a millimeter wave communication link.

In one embodiment, a system for applying a phase modulation to a millimeter wave carrier signal with OOK comprising a transmitting apparatus as described above, a receiving apparatus to receive the amplified phase-modulated carrier signal with OOK, where the receiving apparatus detects an envelope of amplified phase-modulated carrier signal with OOK to recover the binary digital data; and a millimeter wave communication link having a data transmission rate of multi-gigabits (Gbits) per second. For example, the millimeter wave communication link has a data transmission rate of 5-7 Gbits per second.

Such embodiments of the present disclosure concentrates the frequency spectrum to the center of the 7 GHz bandwidth within the 60 GHz band allowed by FCC as well as increases data transmission rate, without the necessity of increasing the receiver complexity.

BRIEF DESCRIPTION OF THE DRAWINGS

The teachings of the embodiments disclosed herein can be readily understood by considering the following detailed description in conjunction with the accompanying drawings.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures and accompanying description depict various embodiments for purposes of illustration only. One skilled in the art will readily recognize from the following description that alternative embodiments of the structures and methods illustrated herein may be employed without departing from the principles described herein. As used herein, the terms "estimating" "determining" or "computing" may be used interchangeably with each other.

System Overview

Figure 1:
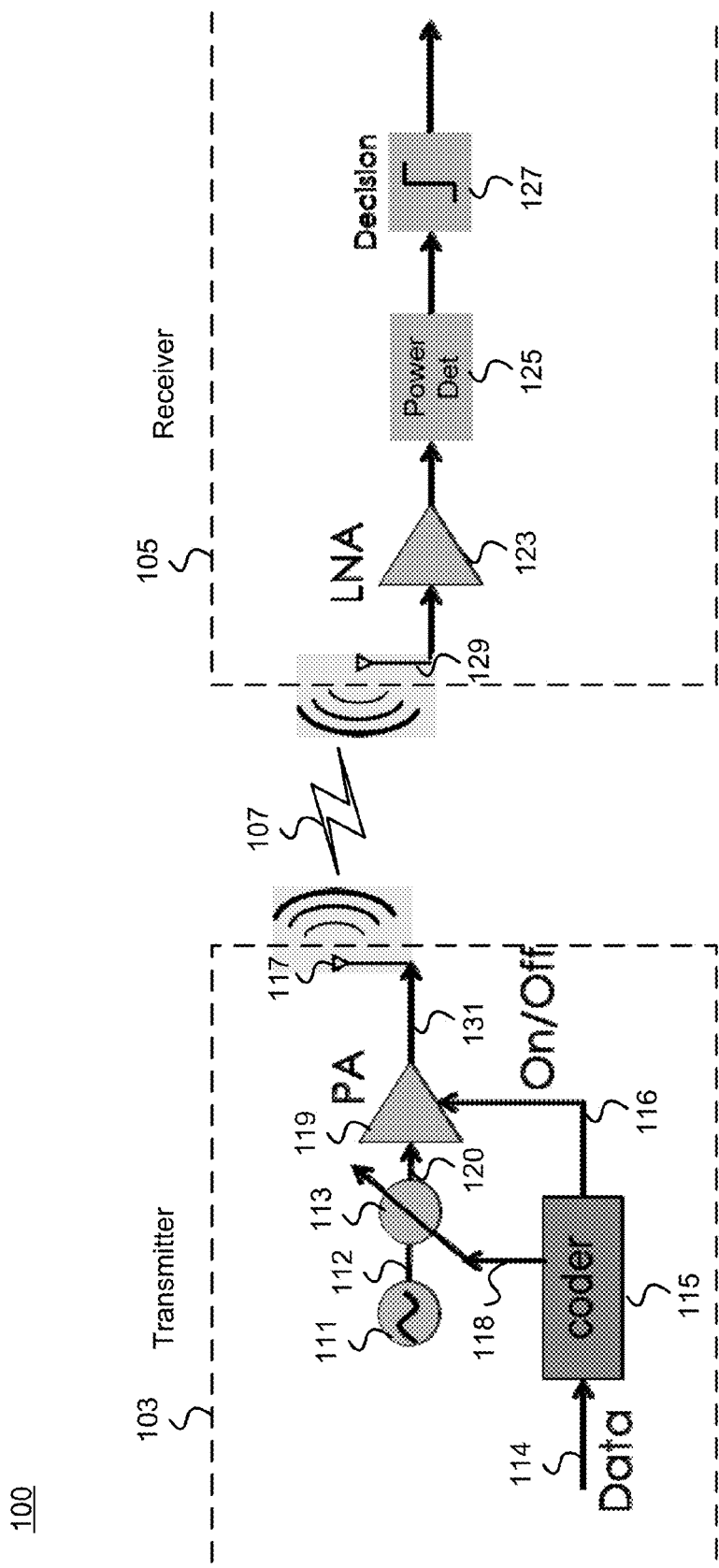
FIG. 1 is a circuit diagram illustrating a communication system based on phase modulated on-off keying (OOK) signals, according to one embodiment.

FIG. 1 is a system diagram illustrating a communication system 100 based on phase modulated on-off keying (OOK) signals, according to one embodiment. The illustrated communication system 100 includes a transmitter 103 and a receiver 105 that communicate via a communication link 107. Only one transmitter 103 and one receiver 105 are shown in FIG. 1 in order to simplify and clarify the description. Embodiments of the communication system 100 can have many transmitters 103 and receivers 105 connected to the communication link 107. Likewise, the functions performed by the various entities of FIG. 1 may differ in different embodiments.

The communication link 107 enables communications between the transmitter 103 and the receiver 105. In one embodiment, the communication link 107 uses standard communication technologies and/or protocols. For example, the communication link 107 may use one of the millimeter wave bands such as 38.6-40.0 gigahertz (GHz) band, 60 GHz band, 71-76 GHz band, 81-86 GHz band, or 92-95 GHz band. Such a communication link 107 may be a point-to-point wireless local area network link, an intersatellite link or a point-to-multipoint communication link. In one embodiment, the communication link 107 may communicate signals compatible with the Wi-Fi standard IEEE 802.11ad on the 60 GHz spectrum with data transfer rates of up to 7 gigabit/second (Gbit/s). In another embodiment, the entities 103 and 105 can use custom and/or dedicated communication technologies instead of, or in addition to the ones described above.

The transmitter 103 can be a device for generating amplified phase-modulated carrier signals with on-off keying (OOK) and transmitting the signals to the receiver 105 over the communication link 107. In the illustrated embodiment of FIG. 1, the transmitter 103 includes a carrier signal source 111, a phase modulation circuit 113, a coder circuit 115, a power amplifier 119, and an interface 117. The components of the transmitter are connected. Those of skill in the art will recognize that other embodiments of the transmitter 103 can have different and/or additional circuits other than ones described here, and that the functions may be distributed among the circuits in a different manner.

Typically, the carrier signal source 111 can be a carrier signal generator for generating a carrier signal 112 with a certain range of frequency. For example, a carrier signal 112 is a millimeter wave, e.g., having a 60 GHz frequency or other frequencies in the range of 30 to 300 GHz. The carrier signal source 111 outputs the carrier signal 112 to the phase modulation circuit 113 for performing phase modulation on the carrier signal 112.

The phase modulation circuit 113 receives the carrier signal 112 from the carrier signal source 111. The phase modulation circuit 113 also receives a phase modulation control signal 118 from the coder circuit 115 (which is described in greater detail below). The phase modulation circuit 113 applies phase modulation to the received carrier signal 112 based on the phase modulation control signal 118 to generate a phase-modulated carrier signal 120. In one embodiment, the phase modulation circuit 113 modulates the carrier signal 112 by applying a 180 degree phase shift to the carrier signal 112 during select time intervals controlled by the phase modulation control signal 118. The phase modulation circuit 113 transmits the generated phase-modulated carrier signal 120 to the power amplifier 119.

The power amplifier 119 receives the phase-modulated carrier signal 120 from the phase modulation circuit 113, and an OOK signal 116 from the coder circuit 115. The power amplifier 119 generates an amplified phase-modulated carrier signal with OOK 131 based on the received signals 120 and 116. In on-off keying, the signal 131 is effectively turned on or off during different time intervals (e.g., clock cycles) as controlled by the OOK signal 116. During on-periods, signal 131 comprises a high frequency signal and during off-periods signal 131 is substantially flat (i.e., very low or approximately zero amplitude). Furthermore, the phase-modulated carrier signal with OOK 131 is phase modulated during on-pulses of the OOK signal such that during each on-pulse, the signal 131 may have, for example, a 0 degree or 180 degree ($\pi$ radian) phase shift relative to the carrier signal 112. The amplified phase-modulated carrier signal with OOK 131 is described in detail with reference to FIG. 3.

The interface 117 transmits the amplified phase-modulated carrier signal with OOK 131 to a receiver 105 via the communication link 107. For example, in one embodiment, the interface 117 includes an antenna and associated components for wirelessly transmitting the amplified phase-modulated carrier signal with OOK 131 to the receiver 105.

As described above, the coder circuit 115 outputs the OOK signal 116 to the power amplifier 119, and phase modulation control signal 118 to the phase modulation circuit 113 to facilitate the generation of the amplified phase-modulated carrier signal with OOK 131. In the illustrated embodiment, the coder circuit 115 receives binary digital data 114, e.g., zeroes or ones from an external source (not pictured). The coder circuit 115 generates an on-off keying (OOK) signal 116 that represents the binary digital data 114. For example, the OOK signal 116 uses "on" and "off" time periods (e.g., where each period corresponds to a period of a clock signal) to represent the "ones" and "zeroes" of the binary digital data 114, respectively or vice versa. In other words, an "on-period" of the OOK signal 116 corresponds to a signal one in the binary data 114 and an "off-period" of the OOK signal 116 corresponds to a signal zero in the binary data 114, or vice versa. Accordingly, the OOK signal 116 has an on and off pattern specified by the binary digital data 114.

In addition, the coder circuit 115 generates a phase modulation control signal 118 for controlling a phase modulated onto the carrier signal 112 based on the on and off pattern of the OOK signal 116. For example, the phase modulation control signal 118 can control the phase modulation circuit 113 to apply phase shifts to the carrier signal 112 based on the on and off pattern of the OOK signal 116 using, for example, duo-binary or alternating phase modulation schemes as described in further detail below. In other words, the phase modulation control signal 118 is synchronized with the on and off pattern of the OOK signal 116. In one embodiment, phase modulation (e.g., phase shift) can be applied to the carrier signal 112 during at least some of the "on" periods of the OOK signal. Since there is no power in the OOK signal during "off" periods, the phase modulation control signal 118 is irrelevant during the "off" periods and phase modulation may or may not be applied during "off" periods according to the phase modulation control signal 118. Additionally, different phase modulation (e.g., different phase shifts) can be applied to the carrier signal 112 during different "on" periods of the OOK signal 116 depending on the phase modulation scheme, examples of which are described in detail with reference to FIG. 2.

The coder circuit 115 transmits the phase modulation control signal 118 to the phase modulation circuit 113. In addition, the coder circuit 115 transmits the OOK signal 116 to the power amplifier 119 for applying an on-off keying to the phase modulated carrier signal 120 as described with reference to the phase modulation circuit 113.

The receiver 105 can be a device for receiving modulated signals (such as the amplified phase-modulated carrier signal with OOK 131 generated by the transmitter 103) and recovering the binary digital data represented by received signal. In the illustrated embodiment, the receiver 105 includes an interface 129 (e.g., an antenna and associated components) for receiving the amplified phase-modulated carrier signal with OOK 131 via the communication link 107. The receiver 105 may also include a low-noise amplifier (LNA) 123, a power detector ("Power Det") 125 and a decision module 127. The LNA 123 amplifies the received signal from the transmitter 103. The power detector 125 generates a signal representing a power or its equivalent of the received signal. The decision module 127 slices the power signal to determine binary digital data, e.g., ones or zeroes. If no errors are present, the determined binary digital data is the data 114 transmitted by transmitter 103 as the amplified phase-modulated carrier signal with OOK 131. Additional components of the receiver 105 (not shown) may operate to detect and/or correct errors or perform other processing on the received data. In one embodiment, the power detector 125 may be an envelope detector to detect the magnitude of the signal. In one embodiment, the power detector 125 may detect a signal that has a monotonic relationship with the power of the signal.

In the communication system 100 described above, the phase modulation performed by the transmitter 103 beneficially narrows the frequency spectrum of the communicated signal relative to an OOK signal without any phase modulation. For example, by adding a phase modulation to OOK signal, the power of the signal is more concentrated on the center range of the frequency band. Therefore, the limited bandwidth is used more efficiently. This is especially helpful for a 60-GHz millimeter wave transmission system that has a 7 GHz bandwidth regulated by Federal Communications Commission (FCC). Furthermore, the receiver 105 can be similar or identical to a conventional OOK receiver 105 because the phase modulation added by the transmitter 103 does not affect the receiver's ability to recover the OOK data.

Example Phase Modulation Control Signals

Figure 2:
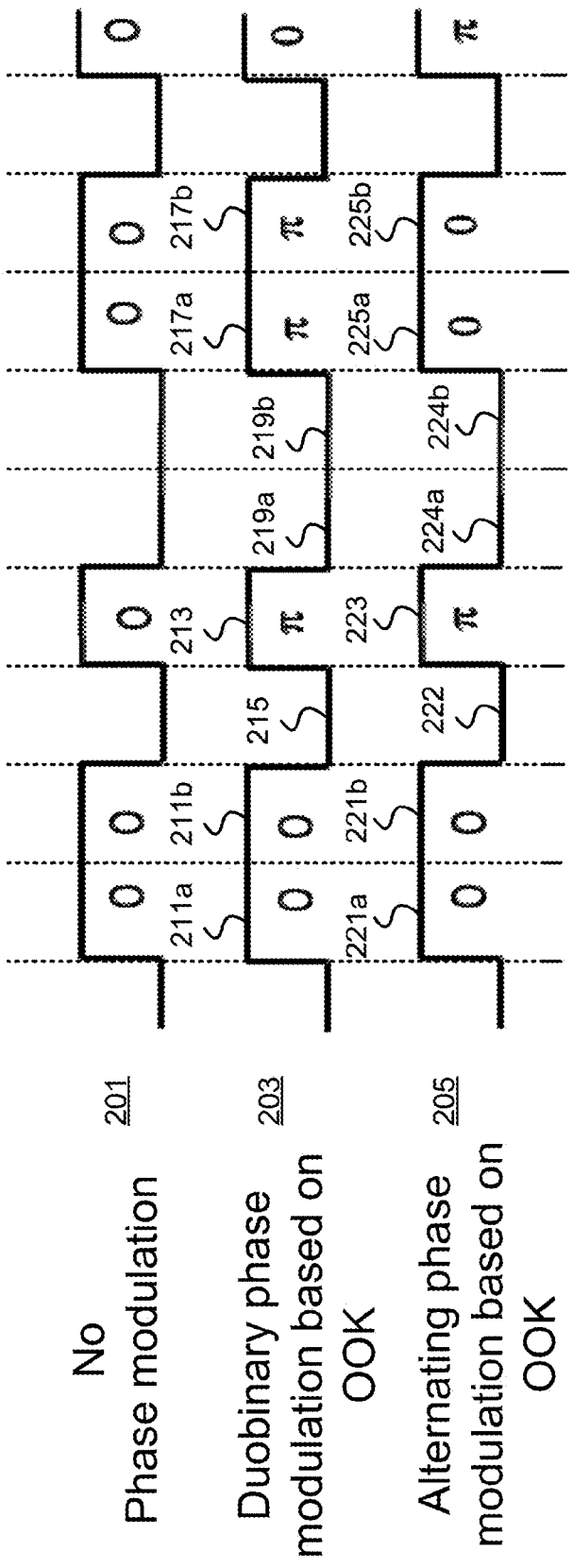
FIG. 2 is a diagram illustrating OOK signals and corresponding phase modulation control signals according to one embodiment.

FIG. 2 is a diagram showing examples of OOK signals 116 and corresponding phase modulation control signals 118 according to one embodiment. In the illustrated embodiment, waveforms 201, 203, 205 correspond to the OOK signals 116 with on-periods and off-periods (where each period is separated by the dashed line), while the numbers (e.g., "0", "$\pi$") associated with the waveforms 201, 203, 205 represent the phases (in radians) that are applied to the carrier signal 112 during on-periods of the OOK signals 116 according to the phase modulation control signals 118. Additionally, the phase modulation control signal 118 can be any value during the off-periods of the OOK signal 116, since no signal will be transmitted during the off-periods.

Referring to FIG. 2, the waveform 201 represents an OOK signal 116 and the numbers "0" illustrated with the waveform 201 indicate that zero phase shift (or no phase modulation) is applied to the carrier signal 112. In other words, the on-periods of the OOK signal have a zero phase shift.

As described above, the system 100 can apply the phase modulation onto the carrier signal 112 based on the on and off pattern of the OOK signal 116. In one embodiment, the phase modulation is a duobinary phase modulation. For example, numbers "0" and "$\pi$" associated with the waveform 203 represents phase modulation control signals 118 that causes the phase modulator 113 to implement a duobinary phase modulation. In this example, the phase modulator 113 generates the phase-modulated signal 120 to have either zero phase shift or a pi ($\pi$) phase shift relative to the carrier signal 112 during a given on-period of the OOK signal 203 depending on the number of consecutive off-periods immediately prior to the given on-period. Specifically, in such a modulation scheme, the phase modulation control signal 118 controls the phase modulator 113 such that any two consecutive on-periods have the same phase if there are an even number (including zero) of off-periods in between them, and the phase modulation control signal 118 controls the phase modulator 113 such that two consecutive on-periods have different phases if there are an odd number of off-periods in between them. As seen in the illustrated example, the waveform 203 includes a first on-period 211a and a second on-period 211b with no off-periods in between. Thus, on-period 211a and 211b have the same phase. Furthermore, a third on-period 213 follows on-period 211b with a single off-period 215 in between. Accordingly, the on-periods 211b and 213 have different phases. Similarly, on-period 217a has the same phase as on-period 213 because there is an even number of off-periods 219a, 219b in between, and on-period 217b has the same phase as on-period 217a because there are no off-periods in between.

To achieve such a duobinary phase modulation control signal 118, the coder circuit 115 may track the phase of the previous on-period and track the number of consecutive off-periods following the previous on-period in the OOK signal 116. For a current on-period, the coder circuit 115 outputs a phase modulation control signal 118 to control the phase modulator 113 to generate the phase modulated signal 120 to have the same phase as the previous on-period if the tracked number of consecutive off-periods is even, and the coder circuit 115 outputs a phase modulation control signal 118 to control the phase modulator 113 to generate the phase modulated signal 120 to have a different phase if the coder circuit 115 determines that the tracked number of off-periods is odd. In one embodiment, the phase shifts can be chosen from a set of zero and pi, although any other different phase pairs are possible. Furthermore, the choice of the initial phase may be either zero or pi.

In another embodiment, the phase modulation control signal 118 controls the phase modulator 113 to apply an alternating phase modulation. In this embodiment, the phases of two consecutive on-periods are different whenever there are one or more off-periods in between them, and the phases of consecutive on-periods without any off-periods between them are the same. For example, on-periods 221a and 221b have the same phase because there is no off-period between them. On-periods 221b and 223 have different phases because there is an off-period 222 between them. On-period 225a has a different phase than on-period 223 because there are off-periods 224a, 224b between them, and on-period 225b has the same phase as on-period 225a because there are no off-periods between them. To enable an alternating phase-modulated carrier signal, the coder circuit 115 may include a state machine that stores the phase of the previous on-period and switches the phase (e.g., from 0 to π or vice versa) after one or more off-periods. In one embodiment, the phase shifts can be chosen from a set of zero and pi, although any other different phase pairs are possible. Furthermore, the choice of the initial phase may be either zero or pi.

Example Phase-Modulated Carrier Signals

Figure 3:
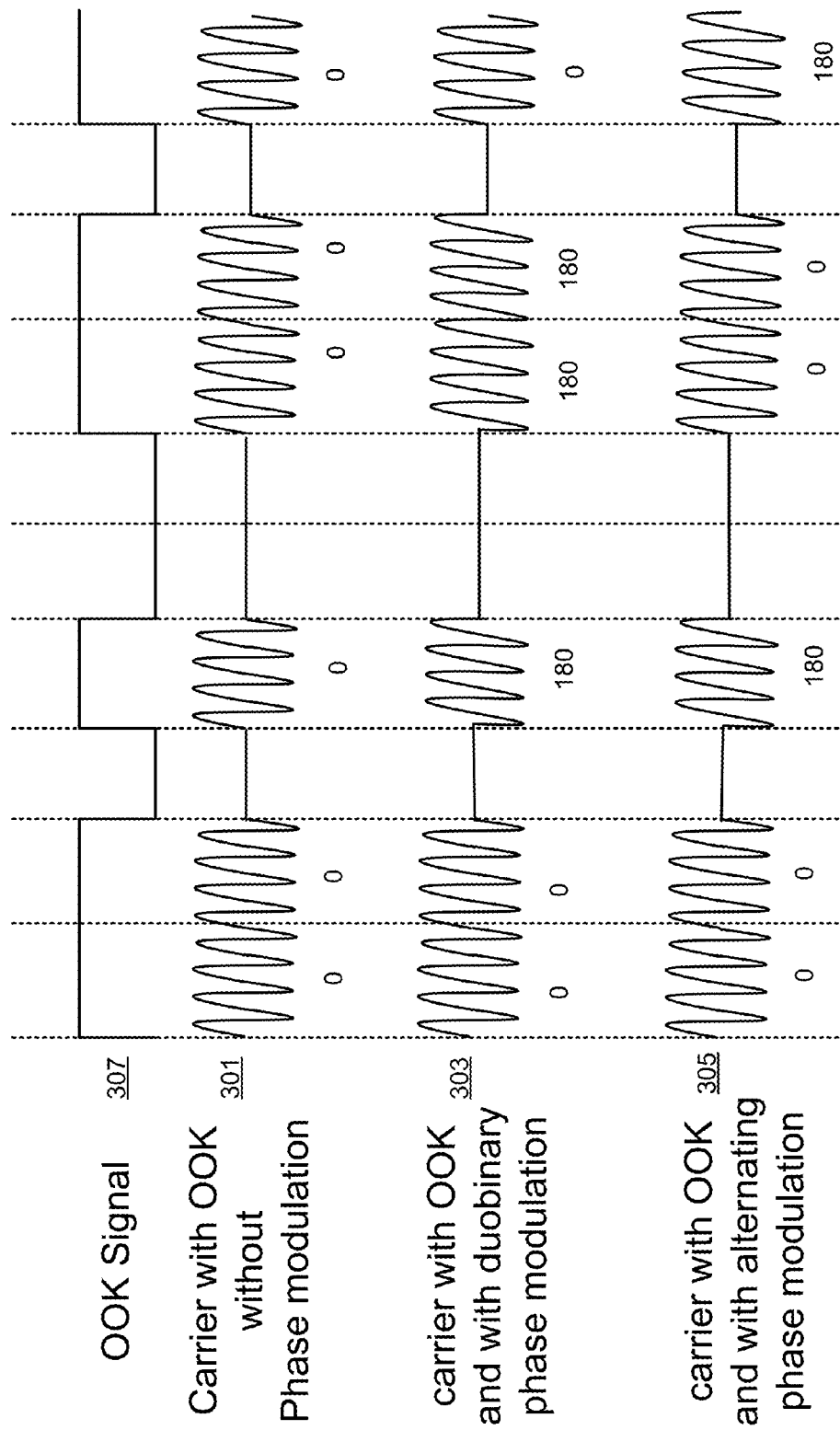
FIG. 3 is a diagram illustrating phase-modulated carrier signals with OOK, according to one embodiment.

Referring to FIG. 3, phase-modulated carrier signals with OOK are illustrated, according to one embodiment relative to an OOK signal 307 with on-periods and off-periods (where each period is separated by the dashed lines). In the illustrated embodiment, waveform 301 represents a carrier signal with OOK without phase modulation. Therefore, the waveform 301 has no phase shift during the on-periods relative to the original carrier signal. In addition, waveform 303 represents a carrier signal modulated according to a duobinary phase modulation and also with OOK. The phase-modulated carrier signal 303 has the same phase for consecutive on-periods if an even number (including zero) of consecutive off-periods exists between them, and the phase-modulated carrier signal 303 has different phase for consecutive on-periods if an odd number of consecutive off-periods exists between them. Further, waveform 305 represents a carrier signal modulated by an alternating phase modulation and with OOK. For example, consecutive on-periods in the modulated carrier signal 305 have different phases if there are one or more off-periods between them, and otherwise have the same phase.

Example Power Spectral Densities

Figure 4:
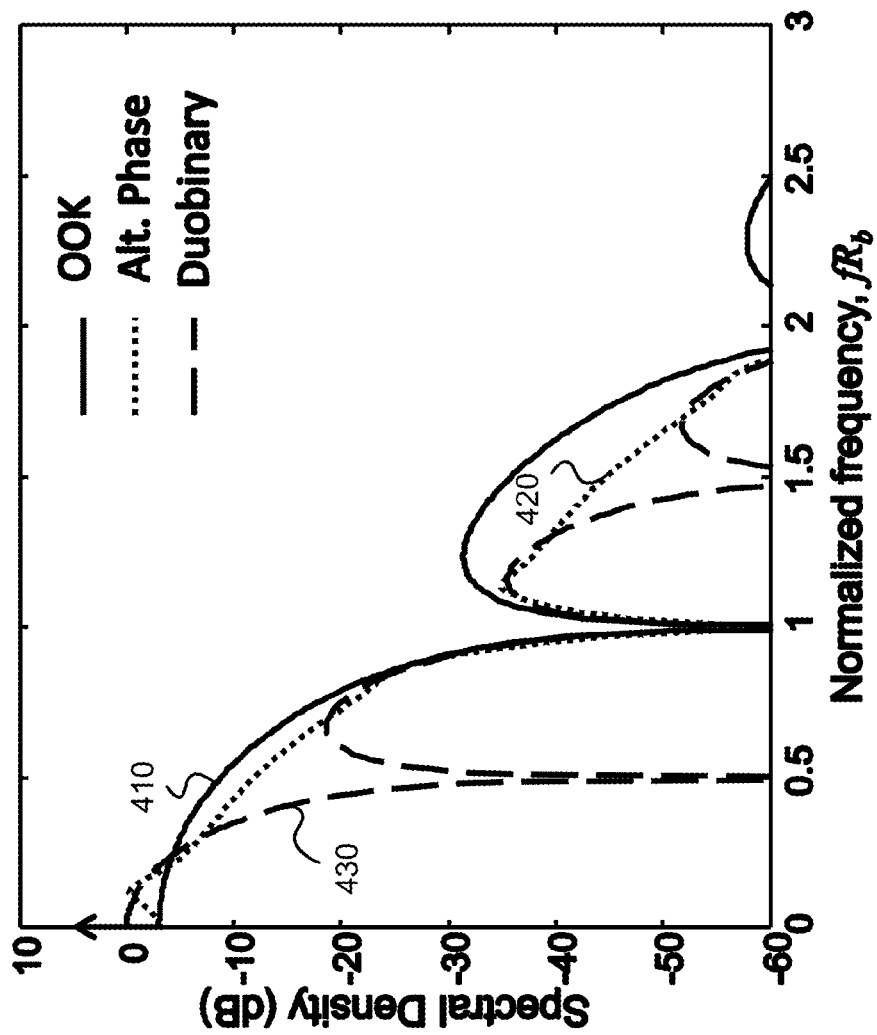
FIG. 4 is a diagram illustrating simulated power spectral densities of the phase-modulated carrier signals shown in FIG. 3, according to one embodiment.

FIG. 4 is a diagram illustrating power spectral densities of the modulated carrier signals shown in FIG. 3, according to one embodiment. For example, the power spectral densities (or power spectrum) of a carrier signal with OOK without phase modulation 410, a carrier signal with OOK and with alternating phase modulation 420, and a carrier signal with OOK and with duobinary phase modulation 430 are illustrated. Compared with the flat power spectrum of carrier signal without phase modulation, power spectrum of the carrier signal modulated by either of the two types of phase modulation is more concentrated on the center of the main and side frequency bands such as 0-1 and 1-2 $fR_b$, where $R_b$ is the bit-rate of the signal and f is the frequency of the signal. In other words, the phase-modulated carrier signal with OOK has more energy concentrated on a narrower frequency range within the bandwidth.

An Example Method

Figure 5:
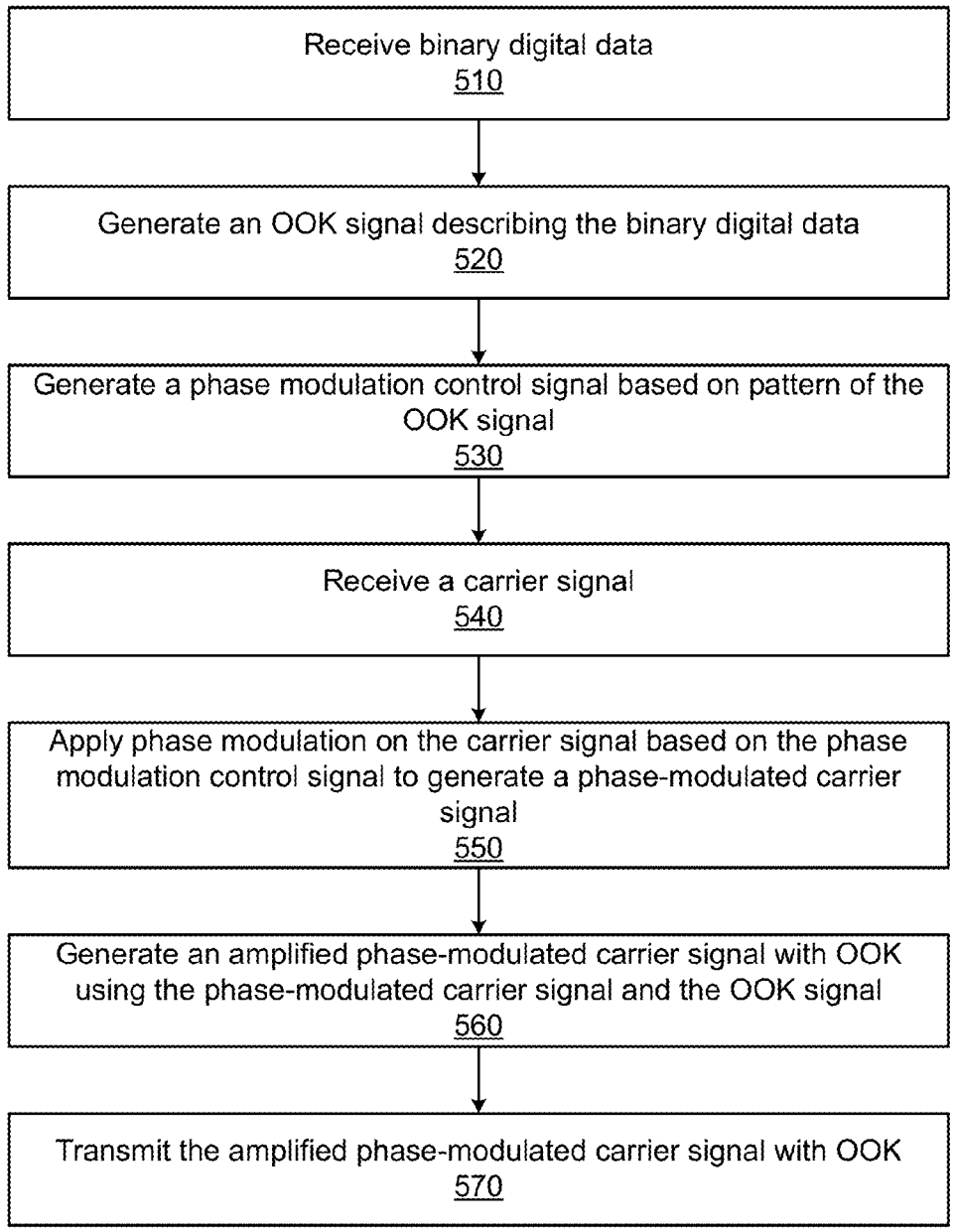
FIG. 5 is a flowchart of a method for phase modulation of a carrier signal based on a pattern of an OOK signal, according to one embodiment.

Referring now to FIG. 5, a flowchart of a method 500 for phase modulation of a carrier signal based on a pattern of an OOK signal is illustrated, according to one embodiment. A transmitter 103 receives 510 binary digital data 114, e.g., zeroes and ones from an external source. The transmitter 103 generates 520 an OOK signal 116 representing the received binary digital data 114. For example, the OOK signal has on-periods and off-periods representing "ones" and "zeroes" of the binary digital data 114, respectively.

The transmitter 103 generates 530 a phase modulation control signal 118 based on pattern of the binary digital data 114. For example, the phase modulation control signal 118 is synchronized with the on and off pattern of the OOK signal 116 representing the received binary digital data 114 and indicates phase shifts according to a duobinary phase modulation or an alternating phase modulation. The transmitter 103 receives 540 a carrier signal 112. For example, the carrier signal 112 is a 60 GHz millimeter wave. The transmitter 103 applies 550 a phase modulation on the carrier signal 112 based on the phase modulation control signal 118 to generate a phase-modulated carrier signal 120. For example, the phase modulation circuit 113 of the transmitter 103 applies, based on the phase modulation control signal 118, a duobinary phase modulation or alternating phase modulation to the carrier signal during pulse (or on-periods) of the OOK signal.

The transmitter 103 also generates 560 an amplified phase-modulated carrier signal with OOK using the phase-modulated carrier signal and the OOK signal. For example, the amplifier 119 of the transmitter 103 outputs zero value during the off-periods of the OOK signal, and output phase-modulated carrier signal during the on-periods of the OOK signal. The transmitter 103 transmits 570 the amplified phase-modulated carrier signal with OOK, for example, to a receiver via a 60-GHz millimeter communication link.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to, with, or together with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

Upon reading this disclosure, those of skill in the art will appreciate still additional alternative designs for the described embodiments. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A transmitting apparatus, comprising:
    a coding circuit for receiving binary digital data and generating an on-off keying (OOK) signal representing the binary digital data, the coding circuit also generating a phase modulation control signal for controlling a phase modulation of a millimeter wave carrier signal based on the on and off pattern of the OOK signal;
    a phase modulation circuit communicatively connected to the coding circuit for receiving the phase modulation control signal and the millimeter wave carrier signal, the phase modulation circuit applying the phase modulation to the millimeter wave carrier signal based on the phase modulation control signal to generate a phase-modulated carrier signal;
    a power amplifier communicatively connected to the coding circuit and the phase modulation circuit for receiving the OOK signal and the phase-modulated carrier signal, the power amplifier generating, based on the OOK signal and the phase-modulated carrier signal, an amplified phase-modulated carrier signal with OOK; and
    an interface to transmit the amplified phase-modulated carrier signal with OOK to a receiving apparatus via a millimeter wave communication link.

2. The transmitting apparatus of claim 1, wherein the phase modulation control signal controls phase modulation during on-periods of the OOK signal.

3. The transmitting apparatus of claim 1, wherein the phase modulation comprises a duobinary phase modulation and wherein the coding circuit is configured to:
    count a number of consecutive off-periods of the OOK signal between a previous on-period of the OOK signal and a current on-period of the OOK signal;
    responsive to determining that the number of the consecutive off-periods is even, generate the phase modulation control signal to control the phase modulation circuit to apply a same phase shift to the millimeter wave carrier signal for the current on-period as applied for the previous on-period; and
    responsive to determining that the number of the consecutive off-periods is odd, generate the phase modulation control signal to control the phase modulation circuit to apply a different phase shift to the millimeter wave carrier signal for the current on-period relative to a phase shift applied for the previous on-period.

4. The transmitting apparatus of claim 3, wherein applying the different phase shift comprises:
    applying no phase shift to the millimeter wave carrier signal for the current on-period responsive to the previous on-period having a phase of pi radians; and
    applying a phase shift of pi radians to the millimeter wave carrier signal for the current on-period responsive to the previous on-period having a phase of zero radians.

5. The transmitting apparatus of claim 1, wherein the phase modulation comprises an alternating phase modulation and wherein the coding circuit is configured to:
- determine a first phase shift applied to the millimeter wave carrier signal for a previous on-period prior to a current on-period;
- apply a same phase shift to the millimeter wave carrier signal for the current on-period if there are no off-periods between the previous on-period and the current on-period; and
- apply a second phase shift to the millimeter wave carrier signal for the current on-period if there are one or more off-periods between the previous on-period and the current on-period, the second phase shift having a different value from that of the first phase shift.

6. The transmitting apparatus of claim 5, wherein the first phase shift has a value of zero radians and the second phase shift has a value of pi radians.

7. The transmitting apparatus of claim 5, wherein the coding circuitry includes a state machine to store the first phase shift of the previous on-period.

8. The transmitting apparatus of claim 1, wherein the millimeter wave communication link comprises a 60 GHz millimeter wave communication link.

9. A system, comprising:
- a transmitting apparatus comprising:
  - a coding circuit for receiving binary digital data and generating an on-off keying (OOK) signal representing the binary digital data, the coding circuit also generating a phase modulation control signal for controlling a phase modulation of a millimeter wave carrier signal based on the on and off pattern of the OOK signal;
  - a phase modulation circuit communicatively connected to the coding circuit for receiving the phase modulation control signal and the millimeter wave carrier signal, the phase modulation circuit applying the phase modulation to the millimeter wave carrier signal based on the phase modulation control signal to generate a phase-modulated carrier signal;
  - a power amplifier communicatively connected to the coding circuit and the phase modulation circuit for receiving the OOK signal and the phase-modulated carrier signal, the power amplifier generating, based on the OOK signal and the phase-modulated carrier signal, an amplified phase-modulated carrier signal with OOK; and
  - an interface to transmit the amplified phase-modulated carrier signal with OOK to a receiving apparatus via a millimeter wave communication link;
- a receiving apparatus to receive the amplified phase-modulated carrier signal with OOK, the receiving apparatus detect an envelope of amplified phase-modulated carrier signal with OOK to recover the binary digital data; and
- the millimeter wave communication link having a data transmission rate of multi-gigabits per second.

10. The system of claim 9, wherein the phase modulation control signal controls phase modulation during on-periods of the OOK signal.

11. The system of claim 9, wherein the phase modulation comprises a duobinary phase modulation and wherein the coding circuit is configured to:
- count a number of consecutive off-periods of the OOK signal between a previous on-period of the OOK signal and a current on-period of the OOK signal;
- responsive to determining that the number of the consecutive off-periods is even, generate the phase modulation control signal to control the phase modulation circuit to apply a same phase shift to the millimeter wave carrier signal for the current on-period as applied for the previous on-period; and
- responsive to determining that the number of the consecutive off-periods is odd, generate the phase modulation control signal to control the phase modulation circuit to apply a different phase shift to the millimeter wave carrier signal for the current on-period relative to a phase shift applied for the previous on-period.

12. The system of claim 11, wherein applying the different phase shift comprises:
- applying no phase shift to the millimeter wave carrier signal for the current on-period responsive to the previous on-period having a phase of pi radians; and
- applying a phase shift of pi radians to the millimeter wave carrier signal for the current on-period responsive to the previous on-period having a phase of zero radians.

13. The system of claim 9, wherein the phase modulation comprises an alternating phase modulation and wherein the coding circuit is configured to:
- determine a first phase shift applied to the millimeter wave carrier signal for a previous on-period prior to a current on-period;
- apply a same phase shift to the millimeter wave carrier signal for the current on-period if there are no off-periods between the previous on-period and the current on-period; and
- apply a second phase shift to the millimeter wave carrier signal for the current on-period if there are one or more off-periods between the previous on-period and the current on-period, the second phase shift having a different value from that of the first phase shift.

14. The system of claim 13, wherein the first phase shift has a value of zero radians and the second phase shift has a value of pi radians.

15. The system of claim 13, wherein the coding circuitry includes a state machine to store the first phase shift of the previous on-period.

16. The system of claim 9, wherein the millimeter wave communication link comprises a 60 GHz millimeter wave communication link.

17. A method comprising:
- generating, at a transmitting apparatus, an on-off keying (OOK) signal representing binary digital data;
- generating, at the transmitting apparatus, a phase modulation control signal for controlling a phase modulation of a millimeter wave carrier signal based on the on and off pattern of the OOK signal;
- applying, at the transmitting apparatus, the phase modulation to the millimeter wave carrier signal based on the phase modulation control signal to generate a phase-modulated carrier signal;
- generating, at the transmitting apparatus, an amplified phase-modulated carrier signal with OOK based on the OOK signal and the phase-modulated carrier signal; and
- transmitting, at the transmitting apparatus, the amplified phase-modulated carrier signal with OOK to a receiving apparatus via a millimeter wave communication link.

18. The method of claim 17, wherein the phase modulation control signal controls phase modulation during on-periods of the OOK signal.

19. The method of claim 17, wherein the phase modulation comprises a duobinary phase modulation and wherein generating a phase modulation control signal for controlling the phase modulation of a millimeter wave carrier signal based on the on and off pattern of the OOK signal comprises:

counting a number of consecutive off-periods of the OOK signal between a previous on-period of the OOK signal and a current on-period of the OOK signal;

responsive to determining that the number of the consecutive off-periods is even, generating the phase modulation control signal to control the phase modulation circuit to apply a same phase shift to the millimeter wave carrier signal for the current on-period as applied for the previous on-period; and responsive to determining that the number of the consecutive off-periods is odd, generating the phase modulation control signal to control the phase modulation circuit to apply a different phase shift to the millimeter wave carrier signal for the current on-period relative to a phase shift applied for the previous on-period.

20. The method of claim 19, wherein applying the different phase shift comprises:

applying no phase shift to the millimeter wave carrier signal for the current on-period responsive to the previous on-period having a phase of pi radians; and applying a phase shift of pi radians to the millimeter wave carrier signal for the current on-period responsive to the previous on-period having a phase of zero radians.

21. The method of claim 17, wherein the phase modulation comprises an alternating phase modulation and wherein generating a phase modulation control signal for controlling the phase modulation of a millimeter wave carrier signal based on the on and off pattern of the OOK signal comprises:

determining a first phase shift applied to the millimeter wave carrier signal for a previous on-period prior to a current on-period;

applying a same phase shift to the millimeter wave carrier signal for the current on-period if there are no off-periods between the previous on-period and the current on-period; and applying a second phase shift to the millimeter wave carrier signal for the current on-period if there are one or more off-periods between the previous on-period and the current on-period, the second phase shift having a different value from that of the first phase shift.

22. The method of claim 21, wherein the first phase shift has a value of zero radians and the second phase shift has a value of pi radians.

23. The method of claim 21 further comprising storing the first phase shift of the previous on-period.

* * * * *